Feb. 19, 1924.  1,483,971
J. GROSSMAN
BRAKING MECHANISM FOR ROLLER CONVEYERS
Filed Sept. 20, 1922
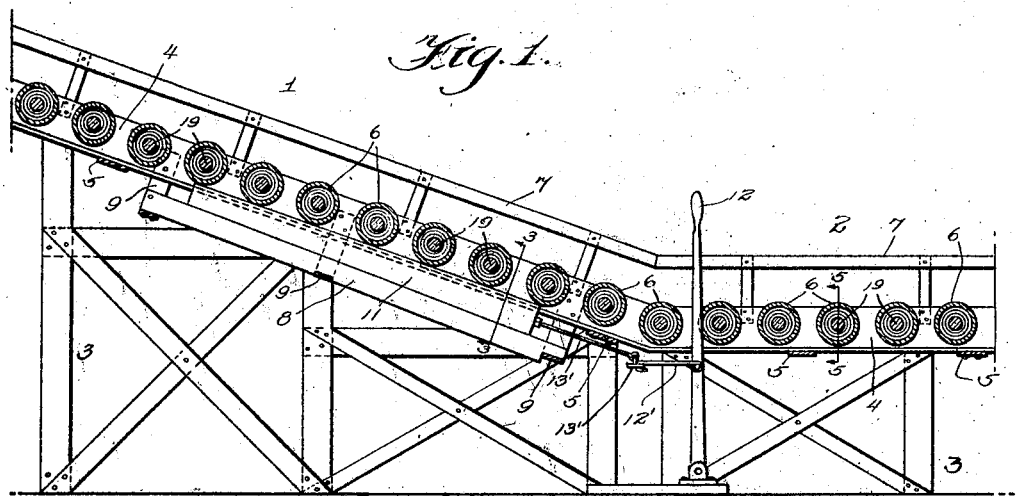
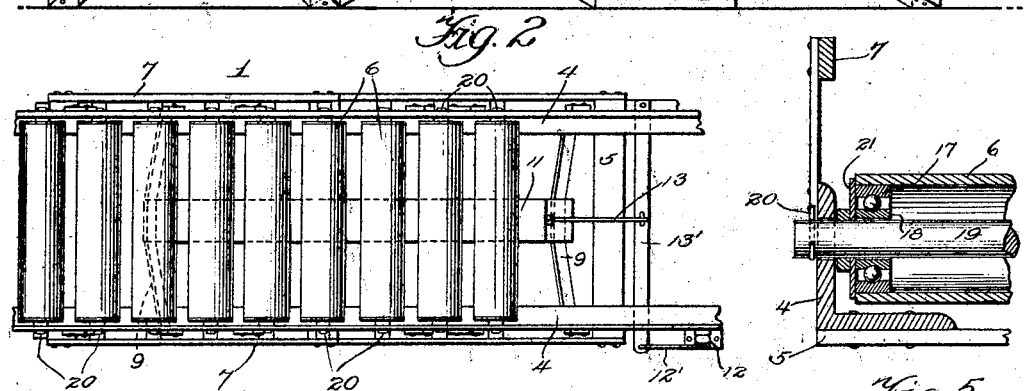
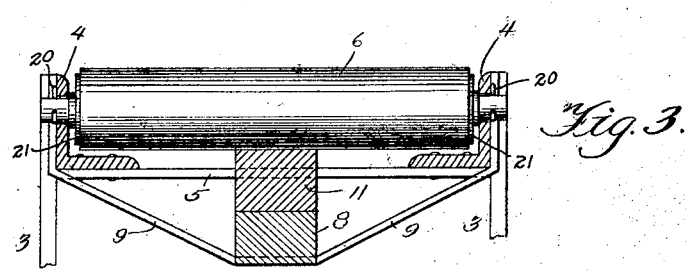
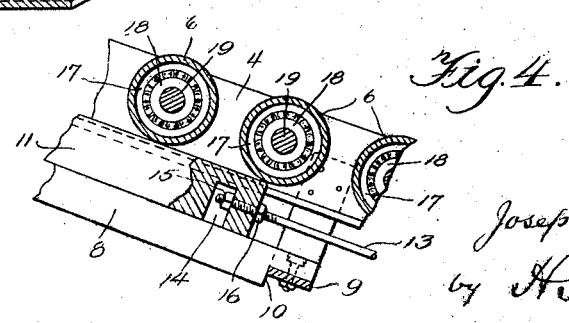
Inventor
Joseph Grossman
by H N Low
Attorney Patented Feb. 19, 1924.

1,483,971

UNITED STATES PATENT OFFICE.

JOSEPH GROSSMAN, OF WALLINGTON, NEW JERSEY.

BRAKING MECHANISM FOR ROLLER CONVEYERS.

Application filed September 20, 1922. Serial No. 589,424.

*To all whom it may concern:*

Be it known that I, JOSEPH GROSSMAN, a citizen of the United States, residing at Wallington, in the county of Bergen and State of New Jersey, have invented certain new and useful Improvements in Braking Mechanism for Roller Conveyers, of which the following is a specification.

The invention relates to roller conveyers and it has particular relation to means for braking one or more of the individual rollers of conveyers of the gravity type.

Heretofore, much difficulty and inconvenience has been encountered in conveyers of the gravity type, and particularly with those of relatively great length or having a relatively steep grade or angle of inclination, by reason of the high velocity attained by the articles transported thereby. If the articles traversing the conveyer are relatively heavy, such as packing cases and the like, the speed attained by such articles by the time they reach the bottom or end portion of the conveyer or a sharp curve therein, is sufficient to either displace a truck by impact therewith, if the articles are delivered directly to a truck, or to become themselves displaced from the conveyer at a sharp curve, and in either case considerable damage is caused to the cases, or other articles.

Another serious disadvantage incidental to conveyers of the type mentioned is that even though the articles do not attain a very high velocity, it frequently occurs that a large number of articles may be delivered to the conveyer at one time and are consequently conveyed and delivered thereby in separate groups. The result is that a sufficient number of persons must be on hand at the delivery end of the conveyer to efficiently handle all of the articles which may be delivered at one time in a group and the duties performed by these attendants is consequently of an interrupted nature.

An object of the invention is to provide a braking mechanism for conveyers, of the character described, by means of which the rotation of a group of the rollers constituting the conveyer, or of a sufficient number of the rollers for the purpose, may be retarded or altogether stopped, in order to slow down or delay the passage of articles therealong.

Another object of the invention is to provide a mechanism, of the character set forth, which may be easily operated to collect the articles at a predetermined location thereon and to deliver the same consecutively to another portion of the conveyer at spaced intervals, in order that they may be individually handled by a relatively few attendants.

A further object of the invention is to provide a brake bar which is so disposed with respect to the direction of rotation of the conveyer rollers, that the action of the rotating rollers tends to draw the braking bar into intimate engagement therewith and to jam the aforesaid bar between the rollers and the brake bar support as soon as the bar is moved into contact with the surfaces of the respective rollers, thereby facilitating the manipulation and efficiency of the braking mechanism.

A still further object of the invention is to provide a braking mechanism for conveyers, of the character described, which is of relatively simple and rugged construction, comprises relatively few parts and which may be quickly and easily embodied in a roller conveyer of standard construction.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings—

Figure 1 is a vertical longitudinal sectional view of a roller conveyer of the gravity type embodying the invention.

Fig. 2 is a plan view of a portion of the structure illustrated in Fig. 1.

Fig. 3 is a transverse sectional view taken on line 3—3 of Fig. 1.

Fig. 4 is an enlarged fragmentary view partly in vertical section at the lower end of the braking mechanism, illustrating the connection between the brake bar and the operating lever.

Fig. 5 is a vertical sectional view of one end of a roller, and neighboring parts, on line 5—5 of Fig. 1.

Referring to the drawings, the conveyer embodying the present invention is illustrated as comprising, in general, an inclined portion 1 and a substantially horizontal portion 2, both of which are supported by any suitable frame structure 3. The portions 1 and 2 of the conveyer each comprise parallel side members 4, preferably of angular cross section, which are connected together and maintained in proper spaced relation with respect to each other by means of a plurality of transversely extending tie rods or bars 5. A plurality of conveyer rollers 6, of any preferred and suitable construction, are mounted on and between the side members 4 for free rotation and are adapted to directly support the weight of the article moving along the conveyer. The conveyer is or may be provided with usual guard or guide rails 7 which direct the passage of articles therealong.

A centrally disposed longitudinally extending brake bar support 8 is suspended beneath the inclined portion 1 of the conveyer by means of a plurality of brackets or hangers 9 which are suitably secured to the side members 4 of the conveyer. The top surface of the support 8 is inclined slightly with respect to the plane of the portion 1 of the conveyer, that is to say, the upper portion of the support 8 is in closer proximity to the rollers 6 of the conveyer than is the lower portion thereof. The hangers 9 may be constructed of the same general shape and overall depth to facilitate the manufacture thereof, and in such event the lower edge of the supporting bar 8 is notched or recessed as at 10 (Fig. 4) in order to maintain the desired angular relation with respect to the plane of the conveyer.

A brake bar 11 is slidably mounted for longitudinal movement upon the support 8 and its lower and upper surfaces converge towards its upper end to conform to the angle of inclination between the supporting bar 8 and the plane of the conveyer, the bar 11 being thus of wedge shape and constituting a wedging means acting between the support 8 and the rollers 6 to have a braking action on the latter.

By means of this construction and arrangement of the supporting bar 8 and the brake bar 11, the upper surface of the latter is at all times parallel to the plane of the conveyer and the co-acting inclined surfaces of the bars 8 and 11 cause the brake bar 8 to move toward and into simultaneous engagement with a group of the rollers 6 with a wedging action when the brake bar 11 is moved upwardly along the supporting bar 8.

The brake bar 11 is moved along the supporting bar 8 and into and out of engagement with the rollers 6 of the conveyer, by means of any suitable device, such for instance as an operating lever 12 which is connected with the lower extremity of the brake bar 11 by means of a link or rod 13, horizontal lever 13′ and link 12′. The link 13 may be connected with the brake bar 11 in any preferred manner but in the present instance the extremity of the link 13 is screw threaded (Fig. 4) and projects into an aperture provided in the end of the brake bar 11 and into a recess 14 formed on the under surface of the brake bar a short distance from its end. A nut 15 is carried by the end of the link which extends into the recess 14 and prevents the link from becoming disengaged from the brake bar. A lock nut 16 is also provided on the link 13 for engagement with the end of the bar 11.

By this particular construction the link 13 may be quickly and easily adjusted with respect to the brake bar 11 in the event of wear of the several parts of the braking mechanism. That is to say, in the event that the coacting inclined surfaces of the supporting bar 8 and the brake bar 11 and the roller-engaging surface of the latter become worn, the nuts 15 and 16 may be loosened and the brake bar 11 may be then moved upwardly along the supporting bar 8 a slight distance to increase the distance between its lower end and the operating lever 12 and restore its top surface to the desired proximity to the rollers. The nuts 15 and 16 may be then again tightened to secure the link 13 to the bar 10 in its adjusted position.

In the present instance the operating lever 12 is shown as being pivotally mounted upon the floor and in close proximity to the braking mechanism but it will be readily apparent that the mechanical connections between the operating lever 12 and the brake bar 11 may be extended and such as to admit of control from a remote station.

While the rollers which are engaged by the brake 11 may be specially shaped for cooperation therewith as may be desired, it is economical and efficient to shape all of the rollers of one pattern and to apply the brake to the article-supporting surfaces of the rollers at any desired point between their ends. As shown in Fig. 2 the middle point is chosen for such application; and my invention is not necessarily confined to applying the brake to the under sides of the rollers, though in most cases such arrangement is preferable.

The action of the brake is or may be such as to elevate the braked rollers slightly, so far as may be permitted by the looseness or open character of the bearings for their journals; or it may press the journals against the upper sides of said bearings.

It will be understood that the roller journals may be mounted in roller or ball bearings in a known manner.

As illustrated the rollers are formed of sections of metal pipe having fixed therein the cages 17 of roller bearings, as seen in Fig. 5. The inner cage elements 18 may be loose on the roller journals 19. Also, the journals may rest loosely in holes in the frame elements 4, being kept in place by cotter pins 20. The rollers may be prevented from having too much endwise movement, but are left free for turning by spacing washers 21 on their journals at the inner sides of the frame elements 4.

From the foregoing it will be apparent that a very simple and efficient braking mechanism is provided in which the braking means is disposed beneath the conveyer for direct contact with the rollers thereof, thereby materially increasing the coefficient of friction between the respective parts by increasing the contact area thereof.

Furthermore, the various instrumentalities are so constructed and proportioned and are so arranged with respect to the conveyer rollers that when the operator moves the brake bar 11 into engagement with the rollers 6 of the conveyer to retard, or altogether effect a cessation of, their rotative movement, the weight of the article carried by the rollers is sufficient, in most instances, to cause the rollers to draw upward and jam the brake bar into wedging engagement therewith and to maintain the brake bar in such position even though the force exerted through the medium of the operating handle may be subsequently released. In such case force must be again applied to the operating lever in an opposite direction to disengage the brake bar 11 from wedging engagement with the rollers 6 to permit the conveyer to continue to function. A further advantage of the present construction is that articles may be collected on the inclined portion 1 of the conveyer adjacent to the lower portion thereof and successively released and delivered under the action of gravity to the horizontal portion 2 of the conveyer in spaced relation for convenient handling.

What is claimed is—

1. In combination with a roller conveyer having fixed rollers, of a braking device mounted for movement into frictional engagement with said rollers, operating against the under sides thereof while the load is free to operate on their upper sides.

2. In combination with a roller conveyer having fixed rollers, of a braking device mounted beneath the rollers of said conveyer for movement upward into direct frictional engagement therewith.

3. In combination with a roller conveyer, of a braking device mounted beneath the fixed rollers of said conveyer for vertical movement upward into frictional engagement therewith.

4. In combination with a roller conveyer, of a braking device mounted beneath the rollers of said conveyer for upward and longitudinal movement into direct frictional contact with said rollers.

5. In combination with a roller conveyer, a supporting member disposed beneath the rollers of said conveyer, a brake member carried thereby for direct engagement with the under sides of said rollers, and means for actuating said brake member.

6. In combination with a roller conveyer having stationary rollers, a supporting member disposed beneath the rollers of said conveyer and having a surface inclined with respect to the plane of said conveyer, a brake member carried by said supporting member and having an inclined surface in engagement with that of said supporting member and means for moving said members relatively to each other to move said brake member upward into direct engagement with the under sides of a plurality of said conveyer rollers.

7. In combination with a roller conveyer having stationary rollers, a plurality of relatively movable members disposed beneath the rollers of said conveyer and provided with coacting inclined surfaces, and means for moving said members relatively to each other to cause one of said members to move upwardly into direct frictional engagement with the under sides of a plurality of said conveyer rollers.

8. In combination with a roller conveyer having stationary rollers, a supporting member disposed beneath the rollers of said conveyer, a longitudinally movable braking member carried by said supporting member for direct frictional engagement with the under sides of said rollers, means for actuating said braking member, and means for adjusting said braking member with respect to said actuating means.

9. In combination with a roller conveyer having stationary rollers, a longitudinally supporting bar suspended from said conveyer and in spaced relation therewith, a brake bar slidably mounted on said supporting bar for longitudinal movement with respect thereto, said bars being provided with coacting inclined surfaces, and means for moving said brake bar along said supporting bar and into wedging engagement with the under side of said conveyer rollers.

10. In combination with a roller conveyer having stationary rollers, a supporting member suspended beneath said conveyer and in spaced relation with respect to the rollers thereof and having a surface inclined with respect to the plane of said conveyer, a longitudinally extending wedging member slidably mounted on said supporting member and under the rollers to be engaged and adapted to be moved longitudinally thereof and into direct frictional contact with the under sides of said rollers to retard the rotative movement thereof, link and lever mechanism for actuating said wedging member and means for adjusting the distance therebetween.

11. In combination with the stationary rollers of a roller conveyer, and their bearings, wedging means arranged to press said rollers, relative to their bearings, and with a braking action, towards the path of material and articles on said conveyer.

12. In combination with the stationary rollers of a roller conveyer, and their bearings, means arranged to press a group of said rollers, relative to their bearings, and with a braking action, all in the same direction and against the superposed load.

13. In combination with the stationary rollers of a roller conveyer, and their bearings, of a brake bar extending past said rollers in the direction of the length of the conveyer and engageable with said rollers, leaving the upper sides of the rollers free for the engagement of a superposed load.

14. In combination with the stationary rollers of a roller conveyer, and their bearings, of a brake bar extending past said rollers in the direction of the length of the conveyer and engageable with said rollers in a direction opposite to the pressure of the load, and means for moving the brake bar endwise to effect such engagement.

15. In a roller conveyer, the combination of stationary rollers, and braking means for pressing said rollers oppositely to the pressure of the load.

In testimony whereof I affix my signature.

JOSEPH GROSSMAN.